United States Patent [19]

Honbo et al.

[11] Patent Number: 5,236,031
[45] Date of Patent: Aug. 17, 1993

[54] PNEUMATIC RADIAL TIRES FOR CONSTRUCTION VEHICLE

[75] Inventors: Yoichi Honbo, Kodaira; Hideaki Hashimoto, Musashino; Motohiro Iwasaki, Higashiyamato, all of Japan

[73] Assignee: Bridgestone Corporation, Tokyo, Japan

[21] Appl. No.: 795,069

[22] Filed: Nov. 20, 1991

[30] Foreign Application Priority Data

Nov. 20, 1990 [JP] Japan .................................. 2-312634

[51] Int. Cl.$^5$ ............................................ B60C 15/06
[52] U.S. Cl. .................................... 152/541; 152/546; 152/555
[58] Field of Search ............... 152/539, 541, 542, 552, 152/555, 546

[56] References Cited

U.S. PATENT DOCUMENTS 3,774,663 11/1973 Montagne .
4,289,184 9/1981 Motomura et al. .................... 52/542

FOREIGN PATENT DOCUMENTS 47-8401 5/1972 Japan .
60-157905 8/1985 Japan .
0155108 7/1987 Japan ................................... 152/539
1115102 5/1968 United Kingdom ................ 152/552

Primary Examiner—Michael W. Ball
Assistant Examiner—Nancy T. Krawczyk
Attorney, Agent, or Firm—Sughrue, Mion, Zinn, Macpeak & Seas

[57] ABSTRACT

A pneumatic radial tire for construction vehicle comprises a carcass of a radial structure comprised of at least one rubberized steel cord carcass ply body and its turnup portion, and a stiffener rubber arranged above a bead core between the carcass ply body and its turnup portion. In order to improve the bead portion durability of this tire, a cord distance between the carcass ply body and its turnup portion passes through greatest value, minimum value, maximum value and smallest value from the vicinity of the bead core outward in the radial direction of the tire and heights of the carcass ply body corresponding to the above minimum and maximum values as well as height of the turnup end measured from the base line satisfy particular relations to a flange height FH of the standard rim.

4 Claims, 7 Drawing Sheets

FIG_1

FIG_2

FIG_5
PRIOR ART

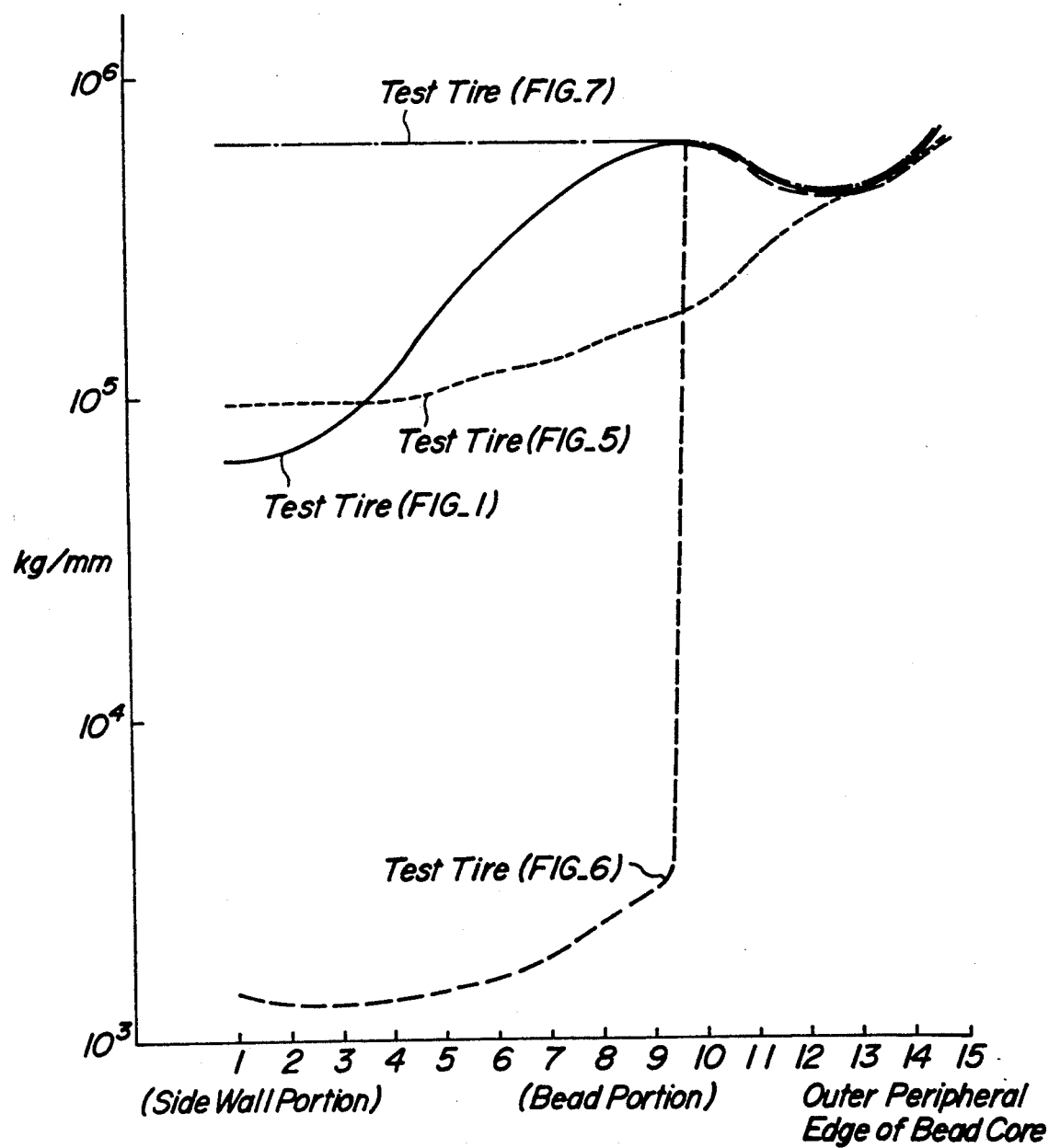
FIG_8

PNEUMATIC RADIAL TIRES FOR CONSTRUCTION VEHICLE

BACKGROUND OF THE INVENTION

1. Field of the Invention

This invention relates to a pneumatic radial tire for a construction vehicle such as a large-size dump truck or the like running on rough roads such as large-scale civil engineering sites, stone pits and the like and subjected to severe working conditions under a heavy load. More particularly it relates to an improvement of bead portion durability in such a tire.

2. Description of the Related Art

The pneumatic radial tire for a construction vehicle is used at such a state that the range of speed is low, the load is high (under the same internal pressure) and the internal pressure is low (under the same load) as compared with pneumatic radial tire for truck and bus of the same size.

In the pneumatic radial tire for a construction vehicle, however, a bending quantity ranging from a sidewall portion to a bead portion is large as compared with other heavy duty tires, and further a large change of load is caused during the running on roads having considerably uneven surfaces, so that problems at the bead portion are frequently caused. Therefore, it is necessary to improve the durability of the bead portion in order to enhance the reliability of the pneumatic radial tire for construction vehicle.

In general, the conventional tire of this type comprises as a body reinforcement a carcass of a radial structure comprised of at least one layer of rubberized steel cords toroidally extending between a pair of bead cores, which is wound around each bead core from inside toward outside to form a turnup portion. Further, as shown in FIG. 5, at least two chafers (reinforcing layers) each comprised of rubberized steel cord fabric or nylon cord fabric and having different cord angles with each other, or a combination of these fabrics are arranged in a bead portion including the bead core and the carcass turnup portion surrounding therearound as a skeleton structure along the carcass turnup portion to form a reinforcement for the bead portion.

Although the rigidity of the bead portion is improved by the reinforcement using the above chafers, when the tire is repeatedly subjected to compression deformation during running of the tire, a large compression strain is applied from an outer end of a rim flange to an outward portion of the tire in the radial direction, which is conspicuous in the tire of this type, whereby fatigue breakage is frequently and easily caused in the carcass turnup portion and the chafer portion. Furthermore, the rigidity required in the bead portion can not sufficiently be obtained, so that there is a risk of separating rubber from the carcass turnup portion made from steel cords and the end of the chafer to cause separation failure.

The bending rigidity can be improved and also the compression deformation can somewhat be mitigated by increasing the thickness of the stiffener rubber located between the carcass ply and its turnup portion above the bead core. When the compression deformation is repeatedly suffered as previously mentioned, the breakage is caused at the carcass turnup portion or the separation failure is caused in the vicinity of the carcass turnup portion, and hence the temperature rise at the bead portion is not particularly avoided, which promotes the separation failure and consequently the above effect is off-set and the durability of the bead portion can not be improved.

SUMMARY OF THE INVENTION

It is, therefore, an object of the invention to provide a pneumatic radial tire for a construction vehicle capable of developing sufficient bead portion durability even under severe conditions repeatedly subjected to compression deformation.

The inventors have found that the durability of the bead portion in the pneumatic radial tire for a construction vehicle is interrelated to the distribution of bending rigidity from the sidewall portion to the bead portion, and as a result the invention has been accomplished.

According to the invention, there is the provision of a pneumatic radial tire for a construction vehicle comprising a carcass of a radial structure comprised of at least one rubberized steel cord carcass ply body toroidally extending between a pair of bead cores and wound around each bead core from inside toward outside to form a turnup portion, and a stiffener rubber arranged above the bead core between the carcass ply body and its turnup portion, characterized in that a cord distance between the carcass ply body and its turnup portion is the greatest in vicinity of the bead core, gradually reduces outward in a radial direction of the tire to arrive at a minimum value, then gradually increases to arrive at a maximum value and further gradually reduces toward an end of the turnup portion to arrive at a smallest value, and a height A of a point located in the carcass ply body corresponding to the above minimum value and measured from a base line of a standard rim, a height B of a point located in the carcass ply body corresponding to the above maximum value and measured from the base line and a height H of the end of the turnup portion measured from the base line satisfy the following relations to a flange height FH of the standard rim:

A: $(1.10-1.60) \cdot FH$
B: $(1.65-2.40) \cdot FH$
H: $(2.60-4.50) \cdot FH$.

In a preferred embodiment of the invention, the minimum value a, maximum value b, greatest value c and smallest value d as a cord distance between the carcass ply body and its turnup portion satisfy the following relations to a maximum size in section of the bead core L:

a: $(0.32-0.44) \cdot L$
b: $(0.46-0.54) \cdot L$
c: $(0.70-0.93) \cdot L$
d: $(0.08-0.19) \cdot L$.

In another preferred embodiment of the invention, the turnup portion extends at a curvature being convex to the carcass ply body in a region corresponding to the minimum value and further extends at a curvature being concave to the carcass ply body in a region corresponding to the maximum value in the section face of the tire inclusive of the rotating axis of the tire.

In the other preferred embodiment of the invention, the stiffener rubber consists of a hard rubber stock layer located above the bead core along the outer surface of the carcass ply body and extending outward in the radial direction of the tire so as to reduce the thickness, and a soft rubber stock layer extending from the hard rubber stock layer along the inner surface of the turnup portion and the outer surface of the carcass ply body outward in the radial direction of the tire, and an outer end of the hard rubber stock layer in the radial direction is arranged at a midpoint between the region indicating the maximum value and the outer end of the turnup portion and an outer end of the soft rubber stock layer in the radial direction is arranged over the outer end of the turnup portion outward in the radial direction of the tire.

In a still further preferred embodiment of the invention, a reinforcing member of at least two laminated layers containing rubberized organic fiber cords and having different cord angles is arranged from the region indicating at least maximum value to the bead core along the inner side of the carcass ply body in the axial direction of the tire in the bead portion.

The term "steel cord layer" used herein means a rubberized steel cord layer obtained by coating a so-called twisted bundle of steel wires with rubber, and the term "reinforcing member" means a layer obtained by coating organic fiber cords such as nylon, polyester, polyamide or the like with rubber.

BRIEF DESCRIPTION OF THE DRAWING

The invention will be described with reference to the accompanying drawings, wherein:

FIG. 8 is a graph showing a distribution of bending rigidity.

DESCRIPTION OF THE PREFERRED EMBODIMENTS

Figure 1:
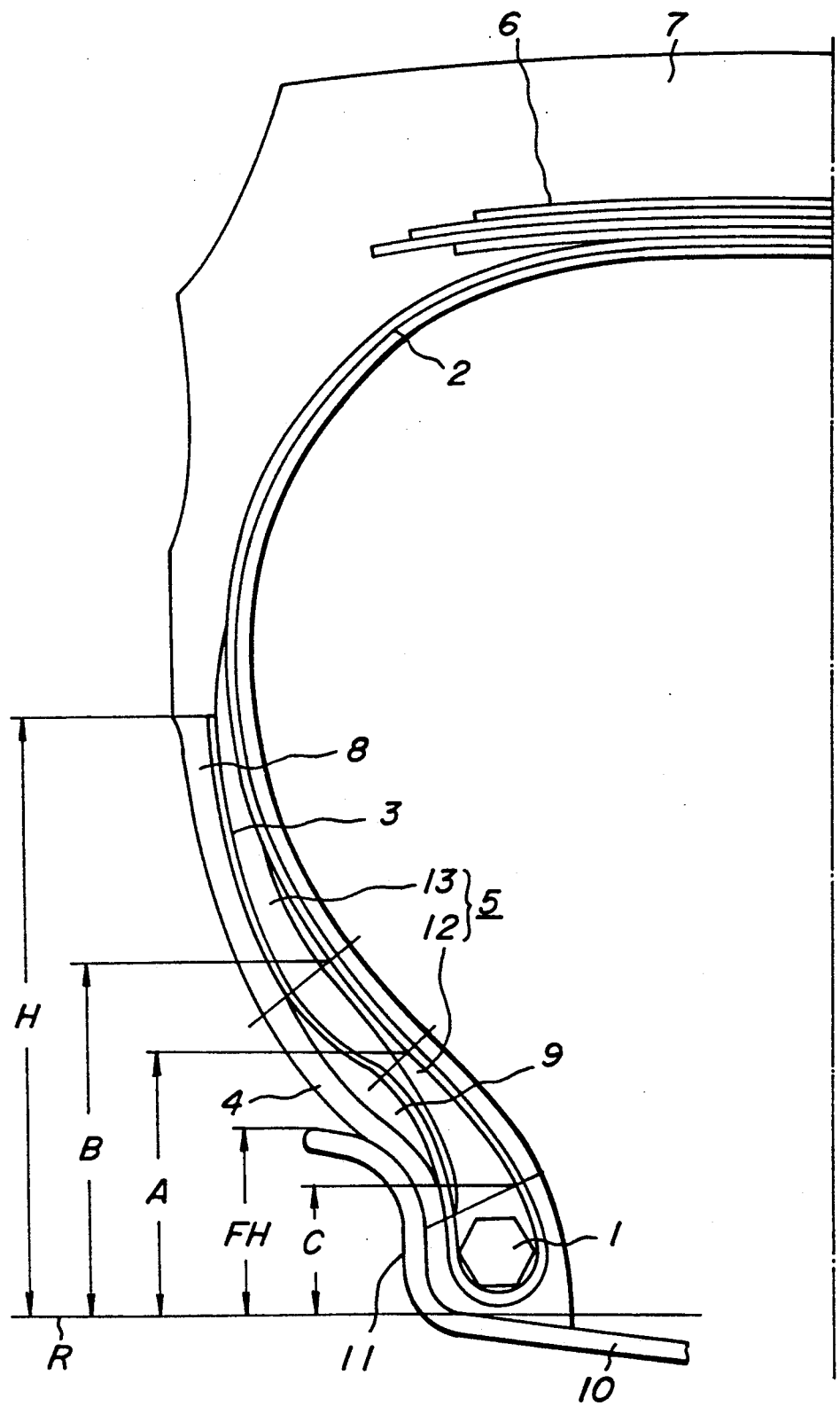
FIG. 1 is a schematically sectional view of a first embodiment of the pneumatic radial tire for construction vehicle according to the invention.

In FIG. 1 is sectionally shown a left half of a first embodiment of the pneumatic radial tire for construction vehicle according to the invention, wherein numeral 1 is a bead core, numeral 2 a carcass ply body, numeral 3 a turnup portion of the carcass ply body 2, numeral 4 a bead portion, numeral 5 a stiffener rubber arranged above the bead core 1, numeral 6 a belt, numeral 7 a tread portion, numeral 8 a sidewall portion, numeral 9 a space rubber, numeral 10 a standard rim, and numeral 11 a flange of the rim 10.

The carcass ply body 2 is a steel cord ply of radial structure toroidally arranged between a pair of bead cores 1 and wound around the bead core 1 from inside toward outside to form the turnup portion 3 extending toward the sidewall portion 8.

The belt 6 is comprised of plural rubberized steel cord layers laminated on an outer periphery of a crown portion of the carcass ply body 2 and embedded in a tread rubber to reinforce the tread portion 7 conventional tire of this type.

In order to enhance the durability of the bead portion 4, the turnup portion 3 of the carcass ply body 2 is arranged in such an uneven shape that the cord distance between the carcass ply body 2 and the turnup portion 3 thereof gradually reduces from the vicinity of the bead core 1 having a greatest value outward in the radial direction of the tire to arrive at a minimum value, gradually increases from the minimum value to arrive at a maximum value and gradually reduces from the maximum value to arrive at a smallest value at the end of the turnup portion, whereby trouble due to compression strain mainly produced at the surface side of the bead portion 4 are avoided and sufficient bending and distorting rigidity is given to the bead portion.

The cord distance between the carcass ply body and the turnup portion thereof is defined by a length of normal line drawn from a point on an outermost cord surface of the carcass ply body 2 in the axial direction of the tire (hereinafter referred to as starting point) to an innermost cord surface of the turnup portion 3 in the axial direction of the tire (see FIG. 2). The starting points at the minimum value and maximum value and the position of the turnup end (i.e. starting point of the smallest value) are required to have heights A, B, H measured from a rim base line R (a straight line passing through a point separate from the rotating axis of the tire by ½ of a size of the standard rim and in parallel to the rotating axis) within the following ranges against a flange height FH of the standard rim:

A: (1.10–1.60)·FH
B: (1.65–2.40)·FH
H: (2.6–4.5)·FH.

Moreover, the starting point of the greatest value usually exists just above the bead core and may have a height C measured from the rim base line R being within the following range against the flange height FH:

C: (0.60–0.85)·FH.

Further, the minimum value a, maximum value b, greatest value c and smallest value d in the cord distance are preferable to be within the following ranges against maximum section size L of the bead core:

a: (0.32–0.44)·L
b: (0.46–0.54)·L
c: (0.70–0.93)·L
d: (0.08–0.19)·L.

The stiffener rubber 5 consists of a hard rubber stock layer 12 extending between the carcass ply body 2 and its turnup portion 3 above the bead core 1 along the outer surface of the carcass ply body 2 outward in the radial direction of the tire, and a soft rubber stock layer 12. extending from the hard rubber stock layer 13 along the outer surface of the carcass ply body 2 and the inner surface of the turnup portion 3, whereby the reinforcement of the bead portion is promoted.

In the stiffener rubber 5, the hard rubber stock layer 12 and the soft rubber stock layer 13 have moduli at 100% elongation of 60–80 kgf/cm$^2$ and 18–35 kgf/cm$^2$, respectively, and the space rubber 9 has a modulus at 100% elongation of 24–56 kgf/cm$^2$.

Figure 3:
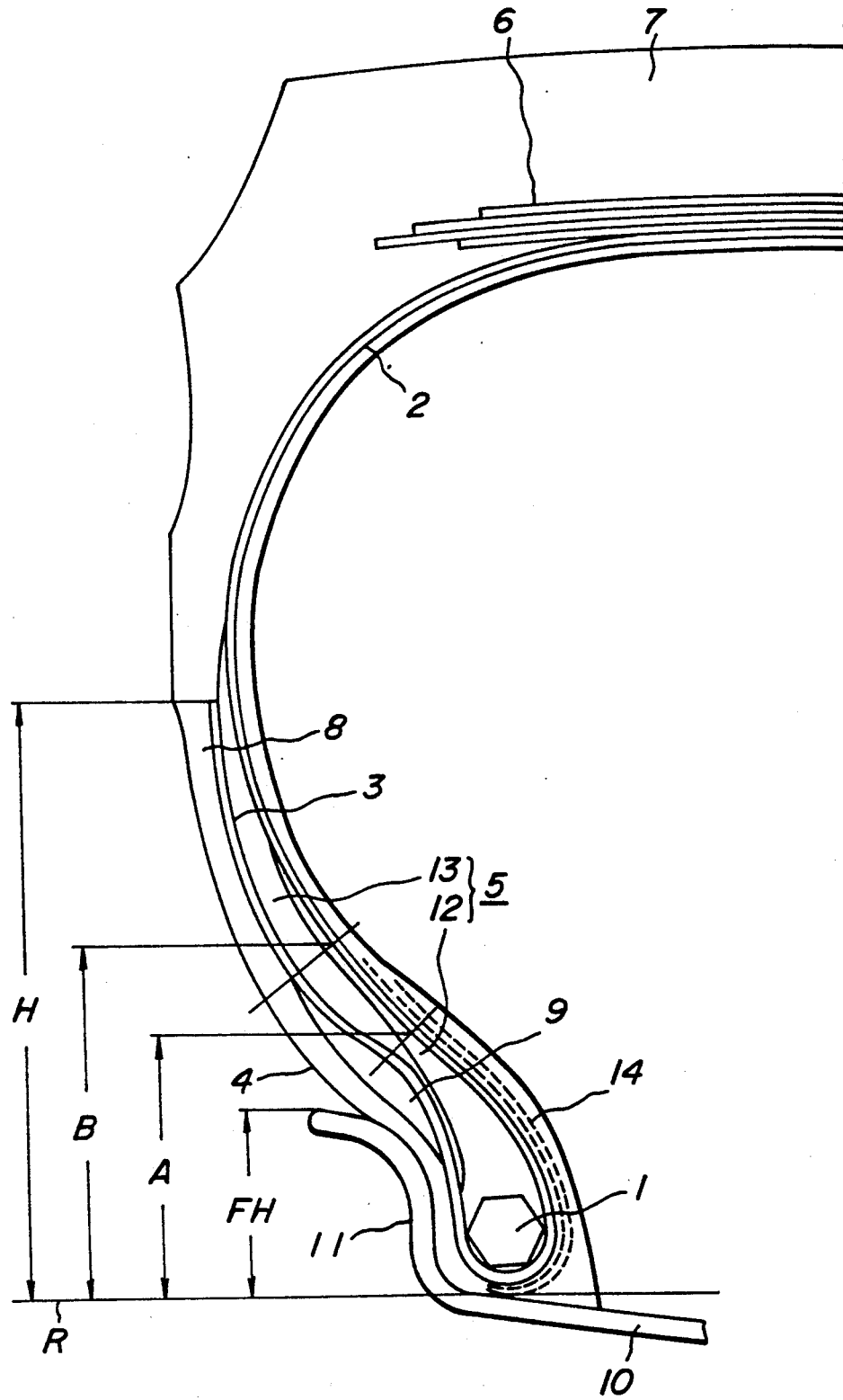
FIG. 3 is a schematically sectional view of a second embodiment of the pneumatic radial tire for construction vehicle according to the invention.

In FIG. 3 is shown a second embodiment of the tire according to the invention, in which a reinforcing member 14 is arranged just beneath the bead core 1 along the inner surface of the carcass ply body 2 in the axial direction of the tire to further improve the bending rigidity. The reinforcing member 14 is comprised of two rubberized fiber cord fabrics, the cords of which fabrics being crossed with each other. In this case, it is preferable that the cord angle is within a range of 30–60° as an angle with respect to a tangential line of a circle at an intersect with the flange height FH. Furthermore, in order to reinforce the bead portion with the reinforcing member 14, the total strength at break in the cord direction of the reinforcing member is desirable to be not less than 200 kgf/cm, while when the total strength at break exceeds 1400 kgf/cm, the rigidity is too high and the separation failure is caused. The rubberized fiber cord fabric is selected to enter the total strength at break of the rubberized fiber cord fabric laminate constituting the reinforcing member 14 within the above range.

Figure 4:
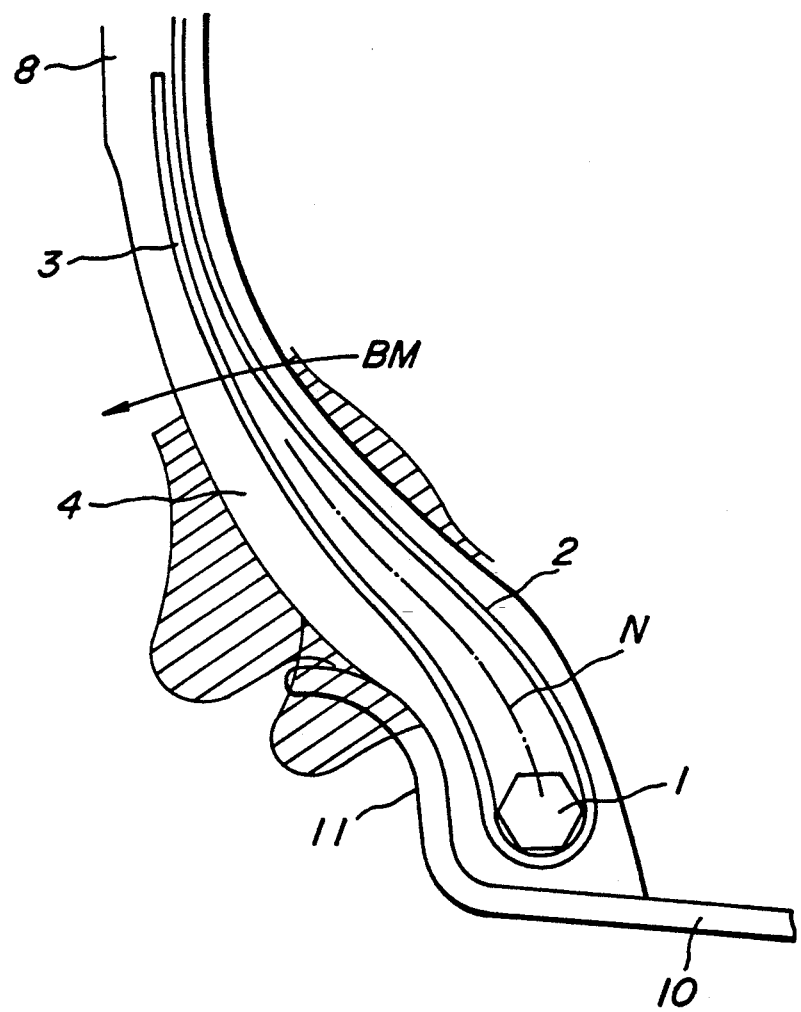
FIG. 4 is a schematic view illustrating strain distribution of the conventional pneumatic radial tire for construction vehicle under loading.

When the tire mounted on a wheel of a construction vehicle is subjected to a load of vehicle weight and load capacity, the bead portion 4 closely fitted to the rim 10 through the bead core 1 is followed to deformation enlarging in the widthwise direction of the tire through the above load at an upward region from the flange 11 of the rim 10 and the bending moment BM directing to the occurrence of deflation along the upper surface of the flange 11 is caused as shown in FIG. 4. In this case, the inside of the tire bordering a neutral axis N of the bending is tensile region and the outside thereof is compression region, so that the distribution of compression strain produced in the outside of the tire is considerably large as compared with the distribution of tensile strain produced in the inside of the tire. This is shown by a solid line with respect to the conventional bead portion (the reinforcing member is omitted in the drawing). This compression strain exhibits the same tendency as in the the outer surface of the bead portion even in turnup portion 3 separate from the outer surface of the bead portion, so that when a large compression is applied to the turnup portion 3 at the upper region of the flange 11, there is caused a separation at an interface between steel cord and rubber due to shearing strain. Further, when the compression strain of the steel cord is too large, the steel cord itself causes fatigue breakage.

Figure 5:
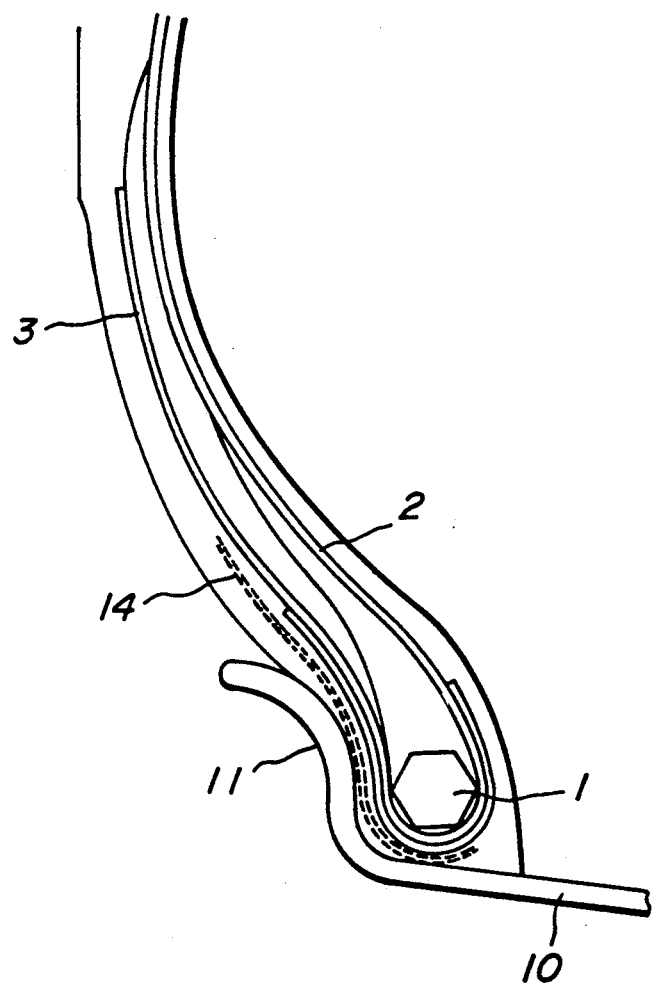
FIGS. 5 to 7 are partial schematic views illustrating a main part of a reinforcement in a bead portion of a tire as compared with the tire according to the invention, respectively.

Moreover, the similar distribution of compression strain is shown even in the conventional structure using the reinforcing member for bead portion as shown in FIG. 5, so that the similar problems are in the reinforcing member for the bead portion.

Now, it has been found that the shearing strain and compression strain are reduced in the compression region outside the neutral axis N in proportion to the distance separate from the outer surface of the bead portion, whereby a region causing the concentration of compression strain in the turnup portion as a nucleus for creating separation or cord breaking-up is arranged near to the neutral axis N to avoid the local strain concentration in the turnup portion and to control the separation failure and cord breaking-up. Particularly, it is advantageous that the turnup portion extends at a concave curvature to the carcass ply body in a region of large compression strain to promote the dispersion and mitigation of strain.

Moreover, the compression force is applied to the bead portion loading from the flange as shown by dotted lines in FIG. 4. As a result, the shearing strain based on the compression force is applied to the turnup portion 3 outside the rim flange in the radial direction, but the above arrangement of the turnup portion advantageously mitigates such a shearing strain.

On the other hand, when the turnup portion is arranged in the vicinity of the neutral axis N, the bending rigidity of the bead portion is particularly decreased. Such a decreased quantity can be compensated by increasing the thickness of the stiffener rubber above the region arranged near the neutral axis or by increasing the cord distance between the carcass ply body and its turnup portion. In this case, it is also effective to promote the dispersion and mitigation of strain by extending the turnup portion at a concave curvature to the carcass ply body.

Furthermore, the turnup portion avoids the fatigue breakage due to buckling at the region arranged near to the neutral axis N, so that it is important to extend the cord distance between the carcass ply body and its turnup portion in such a manner that the cord distance is smallest at the turnup end. That is, the occurrence of buckling at the bead portion is controlled by gradually reducing the thickness of the stiffener rubber between the carcass ply body and its turnup portion to make the rigidity of the bead portion larger than that of the sidewall portion of the tire.

In brief, the turnup portion is extended so that the cord distance between the carcass ply body and its turnup portion is greatest in the vicinity of the bead core, gradually reduces outward in the radial direction of the tire to be a minimum value, gradually increases to be a maximum value and gradually reduces to be a smallest value at the turnup end.

The reason why the heights A and B of the starting points at the side of the carcass ply body exhibiting the minimum value and maximum value and the height H of the turnup end are limited to ranges of A: $(1.10-1.60) \cdot FH$, B: $(1.65-2.40) \cdot FH$ and H: $(2.60-4.50) \cdot FH$ with respect to the flange height FH, respectively, is due to the following facts.

First, when the height A is less than 1.10 FH or more than 1.60 FH, the compression strain produced in the bead portion just above the outer edge of the rim flange is outside the maximum distribution region of the compression strain (see FIG. 4), so that the afore-mentioned action can not be expected.

When the height B is less than 1.65 FH, the bending rigidity of the bead portion is lacking. When it exceeds 2.40 FH, the rigidity of the sidewall portion becomes too large to break the rigidity balance to the bead portion, and hence the deflation of the bead portion becomes large to increase the compression strain.

When the height H is less than 2.60 FH, the bending rigidity of the bead portion is lacking and also the compression, strain concentrates in the turnup end to potentially cause a separation from the turnup end. When it exceeds 4.50 FH, the turnup end enters into a large compression strain region, so that the occurrence of separation at the turnup end portion is caused. Incidentally, the sidewall portion 8 enters into a tensile region.

As the cord distance between the carcass ply body and the turnup portion, the minimum value a, maximum value b, smallest value d arranged at the heights of the above ranges and greatest value c near to the bead core are preferable to be within the following ranges, respectively:

a: $(0.32-0.44) \cdot L$;
b: $(0.46-0.54) \cdot L$;
c: $(0.70-0.93) \cdot L$; and
d: $(0.08-0.19) \cdot L$.

When the minimum value a is less than 0.32L, the bending rigidity of the bead portion is lacking and the fall-down of the bead portion becomes large to increase strain, and hence the improvement of the durability of the bead portion can not be attained. While, when the minimum value a exceeds 0.44L, the distance between the carcass ply body and the turnup portion approaches to the turnup portion of the conventional tire and the effect of mitigating compression strain is less or the thickness of the bead portion becomes too large and hence the heat generation or heat build-up in the bead portion becomes large to cause problems by heat.

When the maximum value b is less than 0.46L, the bending rigidity of the bead portion is lacking the minimum value a, while when it exceeds 0.54L, the bead portion as a whole becomes too rigid in addition to the undesirable increase of heat generation. Hence the strain bearing of the tread portion, particularly belt is increased to cause troubles of the belt and there is a risk of damaging the balance of the durability in the tire as a whole.

When the greatest value c is less than 0.70L, the bending rigidity of the bead portion is lacking the values a and b, while when it exceeds 0.93L, the durability is not improved and the rigidity in the vicinity of the outer periphery of the bead core is too high. As a result the rigidity balance of the bead portion as a whole is lost and the fall-down of the bead portion is undesirably increased.

When the smallest value d is less than 0.08L, the shearing strain between the carcass ply body 2 and the turnup end portion 3 becomes high and there is a risk of generating the separation from this end portion. When it exceeds 0.19L, the bending rigidity of the sidewall portion 8 becomes too high and the strain bearing of the bead portion is undesirably increased (at the same time, the strain bearing of the belt 6 is increased).

In addition to the above arrangement of the turnup portion, a hard rubber stock layer 12 and a soft rubber stock layer 13 having a modulus at 100% elongation lower than that of the hard rubber stock layer are successively arranged between the carcass ply body and its turnup portion 3 wound around the bead core 1 in the bead portion 4, whereby the modulus is large in the region of the bead portion 4 having less strain and low in the region having a large compression strain and hence the strain energy as a whole of the bead portion 4 is efficiently decreased. That is, the strain energy is advantageously proportional to a product of modulus and square of strain. Furthermore, the soft rubber stock layer 13 contributes to mitigate the shearing stress to the turnup portion. The modulus of the space rubber 9 is set to a value slightly higher than that of the soft rubber stock layer 13, which contributes to not only improve the bending rigidity of the bead portion but also mitigate compression strain and shearing strain applied from the outer edge of the rim flange.

The following examples are given in illustration of the invention and are not intended as limitations thereof.

EXAMPLE 1

Figure 6:
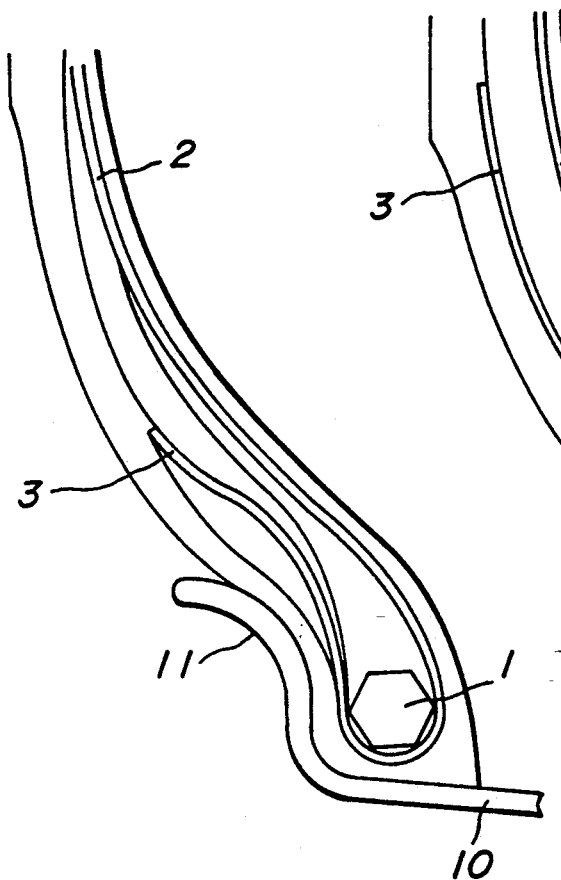
Figure 7:

A pneumatic radial tire for construction vehicle having a tire size of 18.00 R25 was prepared according to the structure shown in FIGS. 1 and 3, which was compared with the conventional tire having the same tire size and the bead portion structure shown in FIGS. 5 to 7.

In these tires, the carcass 2 had a radial structure of one rubberized ply containing steel cords of $(3+9+15)\times0.23$ mm $+1\times0.15$ mm with a tensile strength of 300 kgf/cord (end count: 23 cords/5 cm). The belt 6 was comprised of four rubberized belt layers, two belt layers of which layers being cross laminated plies each containing the same steel cords as used in the carcass (end count: 20 cords/5 cm) and the remaining two belt layers being cross laminated plies each containing steel cords of $3\times7\times0.23$ mm with a tensile strength of 170 kgf/cord (end count: 20 cords/5 cm), the cords of the four layers being alternately crossed with each other at a cord angle of 25° with respect to an equatorial plane of the tire.

Furthermore, the reinforcing member 14 shown in FIG. 3 was comprised of two rubberized fabric containing nylon cords of 1890d/2 (end count: 33 cords/5 cm), the cords of which fabrics being crossed with each other at a cord angle of 35° with respect to a tangential line at a circle corresponding to the height FH of the flange 11 of the rim 10, and extended from the bead core along the inner face of the carcass ply body up to a height of 128 mm as measured from rim base line.

Moreover, the greatest value, smallest value, maximum value and minimum value of the cord distance between the carcass ply body and its turnup portion as well as heights of starting points corresponding to the above distance values are shown in Table 1. In this case, the maximum section size L of the bead core was 32.9 mm.

The stiffener rubber 5 located inside the turnup portion 3 of the carcass ply was comprised of a hard rubber stock layer 12 having a modulus at 100% elongation of 69 kgf/cm$^2$ and a soft rubber stock layer 13 having a modulus at 100% elongation of 24 kgf/cm$^2$, and the space rubber had a modulus at 100% elongation of 35 kgf/cm$^2$.

Each of the test tires was subjected to a drum test for the durability of step load system in which the tire was mounted on a rim of 13.00/2.5 (flange height: 63.5 mm) and run on a drum of 5000 mm in diameter at a speed of 20 km/hr under an internal pressure of 7 kgf/cm$^2$ by applying 80% of a test load of 9250 kg (100% load) only at a starting time, increasing the load to 100% and applying it over 12 hours, and then increasing the load at a rate of 10% from the testing load.

The test results shown in Table 1 are the running time until a rubber crack occurs in the bead portion near to the outer edge of the rim flange in the radial direction or the "bulging" occurs due to the separation failure in the middle of the turnup portion, which are represented by an index value on the basis that the conventional typical bead portion reinforcement shown in FIG. 5 (test tire 3) was 100. As seen from Table 1, the index value of the running time in the cases of FIGS. 1 and 3 according to the invention are 112 and 122, respectively, so that it has been confirmed to considerably improve the durability of the bead portion.

TABLE 1

| Test tire | 1 | 2 | 3 | 4 | 5 | 6 |
|---|---|---|---|---|---|---|
| Tire structure | FIG. 1 | FIG. 3 | FIG. 5 | | FIG. 6 | FIG. 7 |
| Height of starting point in cord distance between carcass ply body and turnup portion (mm) | | | | | | |
| A | 93 | 93 | 93 | 93 | 93 | 93 |
| B | 130 | 130 | 130 | 130 | 130 | 130 |
| C | 52 | 52 | 52 | 52 | 52 | 52 |
| H | 265 | 265 | 265 | 265 | 130 | 265 |
| Cord distance (mm) | | | | | | |
| a | 13.5 | 13.5 | 13.5 | 18.5 | 13.5 | 13.5 |
| b | 16.5 | 16.5 | 7.5 | 17.5 | 16.5 | 16.5 |
| c | 24.5 | 24.5 | 25.5 | 27.0 | 24.5 | 24.5 |
| d | 4.0 | 4.0 | 5.0 | 4.0 | — | 16.5 |
| Reinforcing | none | pres- | pres- | pres- | none | none |

TABLE 1-continued

| Test tire | 1 | 2 | 3 | 4 | 5 | 6 |
|---|---|---|---|---|---|---|
| member | | ence* | ence** | ence** | | |
| Durability of bead portion | 112 | 122 | 100 | 105 | 76 | 86 |
| Remarks | Acceptable Example | | Conventional Example | Comparative Example | | |

*chafer along the carcass ply body
**chafer along the turnup portion

Further, the rigidity distribution against bending deformation in a direction shown by an arrow in FIG. 3 was measured with respect to the test tires 1, 3, 5 and 6 to obtain results as shown in FIG. 8.

In the structure of the test tire 5 (see FIG. 6), the rigidity at the outward region of the turnup end in the radial direction is very small and the stepwise difference of rigidity between the sidewall portion and the bead portion is large, so that the falling down of the region between the sidewall portion and the bead portion becomes particularly large under a heavy load and hence the separation failure and cord breaking-up are apt to be caused at a premature stage as seen from FIG. 8. In the structure of the test tire 6 (see FIG. 7), the rigidity is uniform between the side-wall portion and the bead portion, but the turnup portion is buckled in the vicinity of the bead portion showing the minimum value of the cord distance, so that the breakage occurs in the turnup portion of the carcass ply.

On the contrary, in the structure of the test tire 1 (see FIG. 1), the stepwise difference of rigidity between the sidewall portion and the bead portion is small and the rigidity near to the minimum value of the cord distance causing the buckling is large as compared with the test tire 3 (see FIG. 5) of the conventional structure, so that the falling down between the sidewall portion and the bead portion and the buckling of the turnup portion near to the minimum value of cord distance can be suppressed.

EXAMPLE 2

Figure 2:
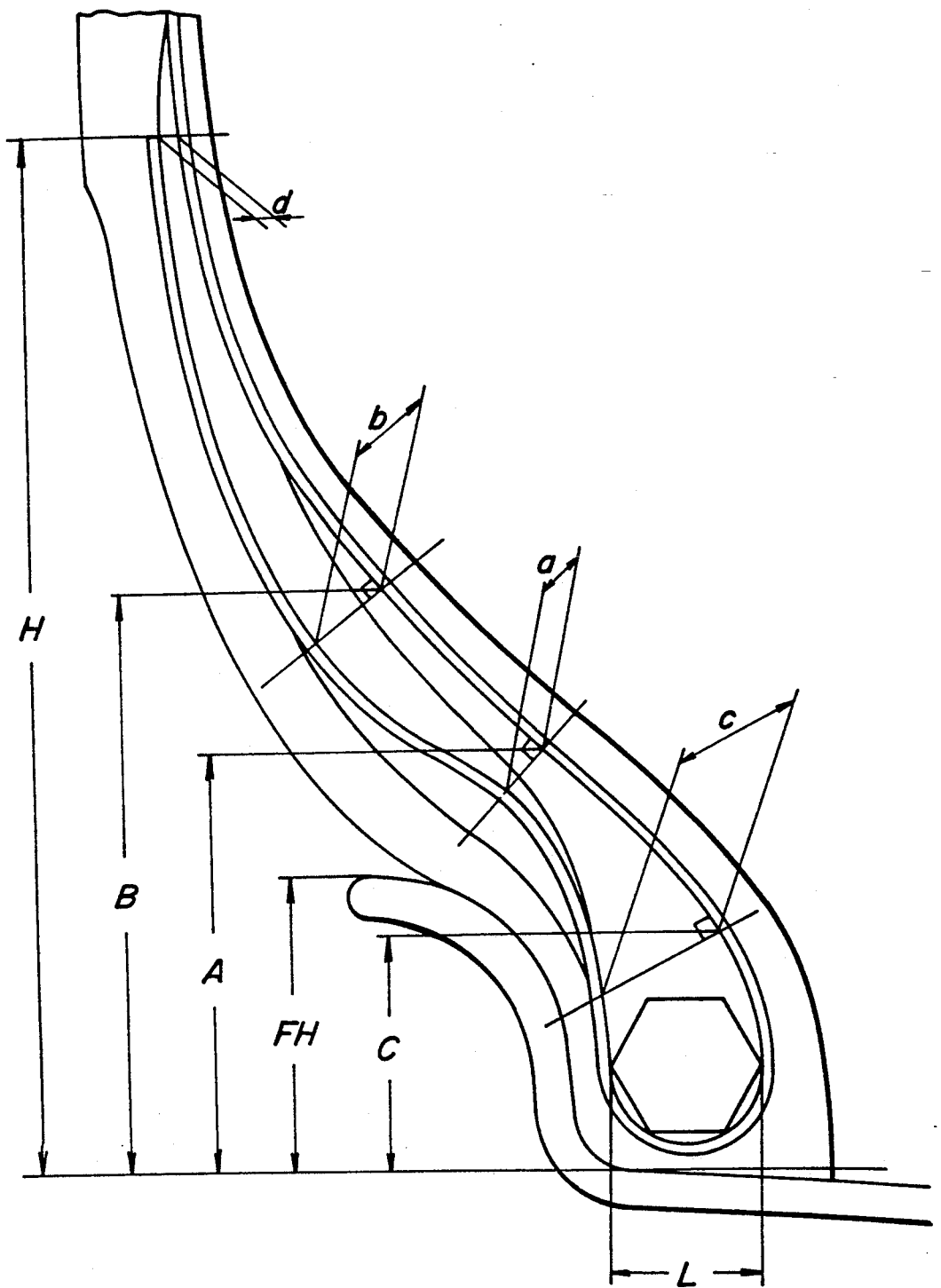
FIG. 2 is a partially enlarged schematic view of the tire shown in FIG. 1.

A pneumatic radial tire for construction vehicle having a tire size of 36.00 R51 was prepared according to the structure shown in FIG. 1 or 2, which was compared with the conventional tire having the same tire size and the bead portion structure shown in FIG. 5.

In these tires, the carcass 2 had a radial structure of one rubberized ply containing steel cords of $\{(3+9+15)+6\times(3+9+15)\}\times 0.175$ mm$+1\times 0.175$ mm with a tensile strength of 1040 kgf/cord (end count: 11 cords/5 cm). The belt 6 was comprised of six rubberized belt layers, four belt layers of which layers being cross laminated plies each containing steel cords of $7\times 7\times 0.25$ mm$+1\times 0.15$ mm with a tensile strength of 555 kgf/cord (end count: 16 cords/5 cm) and the remaining two belt layers being cross laminated plies each containing steel cords of $3\times 7\times 0.23$ mm with a tensile strength of 170 kgf/cord (end count: 15 cords/5 cm), the cords of the six layers being alternately crossed with each other at a cord angle of 25° with respect to an equatorial plane of the tire.

Furthermore, the reinforcing member 14 was comprised of two rubberized fabric containing nylon cords of 1890d/2 (end count: 33 cords/5 cm), the cords of which fabrics being crossed with each other at a cord angle of 35° with respect to a tangential line at a circle corresponding to the height FH of the flange 11 of the rim 10, and extended from the bead core along the inner face of the carcass ply body up to a height of 290 mm as measured from rim base line.

Moreover, the greatest value, smallest value, maximum value and minimum value of the cord distance between the carcass ply body and its turnup portion as well as heights of starting points corresponding to the above distance values are shown in Table 2. In this case, the maximum section size L of the bead core was 52.9 mm.

The stiffener rubber 5 located inside the turnup portion 3 of the carcass ply was comprised of a hard rubber stock layer 12 having a modulus at 100% elongation of 69 kgf/cm$^2$ and a soft rubber stock layer 13 having a modulus at 100% elongation of 24 kgf/cm$^2$, and the space rubber had a modulus at 100% elongation of 35 kgf/cm$^2$.

Each of the test tires was subjected to a drum test for the durability of step load system in which the tire was mounted on a rim of 26.00/5.0 (flange height: 127 mm) and run on a drum of 5000 mm in diameter at a speed of 20 km/hr under an internal pressure of 7 kgf/cm$^2$ by applying 80% of a test load of 46250 kg (100% load) only at a starting time, increasing the load to 100% and applying it over 12 hours, and then increasing the load at a rate of 10% from the testing load.

The test results shown in Table 2 are the running time until rubber crack occurs in the bead portion near to the outer edge of the rim flange in the radial direction or the "bulging" occurs due to the separation failure in the middle of the turnup portion, which are represented by an index value on the basis that the conventional typical bead portion reinforcement shown in FIG. 5 (test tire 9) was 100. As seen from Table 2, the index value of the running time in the cases of FIGS. 1 and 3 according to the invention are 116 and 126, respectively, so that it has been confirmed to considerably improve the durability of the bead portion.

TABLE 2

| Test tire | 7 | 8 | 9 | 10 |
|---|---|---|---|---|
| Tire structure | FIG. 1 | FIG. 3 | FIG. 5 | |
| Height of starting point in cord distance between carcass ply body and turnup portion (mm) | | | | |
| A | 194 | 194 | 194 | 194 |
| B | 270 | 270 | 270 | 270 |
| C | 83 | 83 | 83 | 83 |
| H | 462 | 462 | 462 | 462 |
| Cord distance (mm) | | | | |
| a | 20 | 20 | 20 | 28.5 |
| b | 26 | 26 | 15.5 | 27 |
| d | 8.0 | 8.0 | 9.0 | 8.0 |
| Reinforcing member | none | presence* | presence** | presence** |
| Durability of bead portion | 116 | 126 | 100 | 108 |
| Remarks | Acceptable Example | | Conventional Example | Comparative Example |

*chafer along the carcass ply body
**chafer along the turnup portion

As mentioned above, according to the invention, the bead portion durability of the pneumatic radial tire for construction vehicle required for satisfying the demand of improving transportation productivity can considerably be improved under severe working conditions for use on irregular road having many curves with the increase of total weight accompanied with the large scaling of the construction vehicle.

What is claimed is:

1. A pneumatic radial tire for construction vehicle comprising; a carcass of a radial structure having at least one rubberized steel cord carcass ply body toroidally extending between a pair of bead cores and wound around each bead core from inside toward outside to form a turnup portion, a stiffener rubber arranged above the bead core between the carcass ply body and its turnup portion, a cord distance measured normal to the carcass ply body between the axially outermost surface of the carcass ply body and the axially innermost surface of the turnup portion is the greatest value c in vicinity of the bead core and gradually reduces outward in a radial direction of the tire to arrive at a minimum value a, then gradually increases to arrive at a maximum value b and further gradually reduces toward an end of the turnup portion to arrive at a smallest value d, wherein a height A of a point located in the carcass ply body corresponding to the above minimum value and measured from a base line of a standard rim when said tire is mounted on a standard rim, a height B of a point located in the carcass ply body corresponding to the above maximum value and measured from the base line and a height H of the end of the turnup portion measured from the base line satisfy the following relations to a flange height FH of the standard rim;

A: $(1.10-1.60) \cdot FH$
B: $(1.65-2.40) \cdot FH$
H: $(2.60-4.50) \cdot FH$, and wherein said cord distances of said minimum value a, maximum value b, greatest value c and smallest value d satisfy the following relations to the maximum axial width of the bead core L:

a: $(0.32-0.4) \cdot L$
b: $(0.46-0.54) \cdot L$
c: $(0.70-0.93) \cdot L$
d: $(0.80-0.19) \cdot L$.

2. The pneumatic radial tire according to claim 1, wherein said turnup portion extends at a curvature being convex to the carcass ply body in a region corresponding to the minimum value and further extends at a curvature being concave to the carcass ply body in a region corresponding to the maximum value in the section face of the tire inclusive of the rotating axis of the tire.

3. The pneumatic radial tire according to claim 1, wherein said stiffener rubber consists of a hard rubber stock layer located above the bead core along the outer surface of the carcass ply body and extending outward in the radial direction of the tire so as to reduce the thickness, and a soft rubber stock layer extending from the hard rubber stock layer along the inner surface of the turnup portion and the outer surface of the carcass ply body outward in the radial direction of the tire, and an outer end of the hard rubber stock layer in the radial direction is arranged at a midpoint between the region indicating the maximum value and the outer end of the turnup portion and an outer end of the soft rubber stock layer in the radial direction is arranged over the outer end of the turnup portion outward in the radial direction of the tire.

4. The pneumatic radial tire according to claim 1, wherein a reinforcing member of at least two laminated layers containing rubberized organic fiber cords and having different cord angles are arranged from the region indicating at least maximum value to the bead core along the inner side of the carcass ply body in the axial direction of the tire in the bead portion.

* * * * *